United States Patent [19]
Nollen et al.

[11] 3,915,004
[45] Oct. 28, 1975

[54] THERMOMETERS
[75] Inventors: Bernhard Nollen, Ahrensburg; Klaus Dickhauser, Taunusstein, both of Germany
[73] Assignee: Hoechst Aktiengesellschaft & Internationaler Dienst fur Betriebsberatung und Marktforschung GmbH, Germany
[22] Filed: Apr. 9, 1973
[21] Appl. No.: 349,377

[30] Foreign Application Priority Data
Apr. 12, 1972 Germany............................ 2217516

[52] U.S. Cl. ................................................ 73/371
[51] Int. Cl.² ........................................... G01K 5/34
[58] Field of Search ....... 73/371, 363, 362.3, 368.2, 73/368, 358

[56] References Cited
UNITED STATES PATENTS
| | | | |
|---|---|---|---|
| 1,736,984 | 11/1929 | Sheats | 73/368.2 |
| 2,115,501 | 4/1938 | Vernet | 73/362.3 |
| 2,633,025 | 3/1953 | Boice | 73/343 R |
| 3,490,287 | 1/1970 | Coben | 73/371 |
| 3,631,721 | 1/1972 | Nollen | 73/371 |
| 3,739,642 | 6/1973 | Klinger | 73/371 |

Primary Examiner—S. Clement Swisher
Assistant Examiner—Denis E. Corr
Attorney, Agent, or Firm—James E. Bryan

[57] ABSTRACT

This invention relates to a volume expansion thermometer comprising a capillary tube means of a transparent plastic material one end of which tube is open and the other end of which is attached to, and is in communication with, an otherwise closed reservoir for liquid, an expansion body means disposed in the said reservoir, and an indicating liquid means in the reservoir and surrounding said expansion body.

2 Claims, 5 Drawing Figures

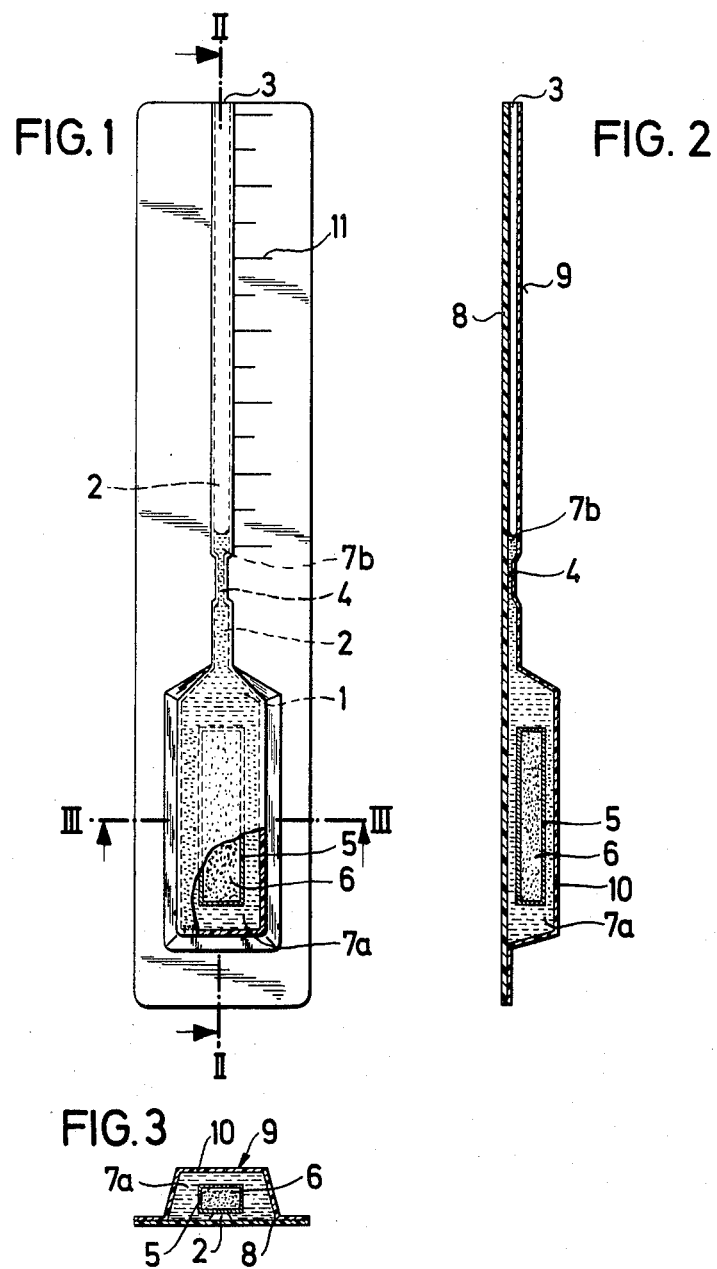

THERMOMETERS

This invention relates to thermometers, which work on the principle of thermal volume expansion, and, which contain an indicating liquid and an expansion medium.

The lack of trained staff in hospitals necessitates rationalization in particular of the routine work there. One task which normally has to be carried out twice daily in hospitals is taking patients' temperatures. Before a patient's temperature is measured, the thermometer to be used is disinfected.

This unavoidable operation on the one hand, and, on the other hand the fragility of conventional mercury-in-glass thermometers, which is a potential danger to the patient, are disadvantages which are inherent in the conventional thermometers which work on the principle of volume expansion.

German Auslegeschrift No. 1,698,085 discloses a thermometer, which works on the principle of volume expansion, made of transparent plastic material, in which a capillary-like space containing an indicating liquid is separated from a space containing an expansion medium of wax by a wall which acts like a membrane. This thermometer has the disadvantage, however, that the space which contains the expansion medium (called the capsule) must be so formed as to be stable against the high pressures exerted by the wax which expands under the action of heat. This is necessary for the following reasons: The wax enclosed in the capsule expands under the action of sufficient heat, and intially retains its solid or gelatinous consistency. The expansion of the wax before it becomes liquid is considerable, and the pressure it exerts on the walls of the capsule enclosing the wax is correspondingly large.

When further heat is supplied to the wax, the latter passes into the liquid state, accompanied by a further expansion in volume. If the force exerted by the wax exerts itself on the total wall surface of the capsule, however, only part of the total effective force acts on the membrane wall between the capsule and the capillary space containing the indicating liquid, the greater part of the force causing an arching outwards of the capsule walls which are not in contact with the indicating liquid and, therefore, cannot contribute to the pressure transfer to the latter. To prevent such arching, the walls of the capsule must be of an appropriate thickness. The volume expansion of the wax thus causes a very marked arching of the membrane wall between the capsule and capillary space of the thermometer and this means that the capillary wall also must be of a material which resists the strong force.

For the above-mentioned reasons the thermometer described in German Auslegeschrift No. 1,698,085, has the disadvantage that the temperature indicator has a delayed action as a result of the necessary wall thickness of the capsule body, and the reading thus may be inaccurate.

Further, in this known thermometer, the area of the surface which transfers the pressure of the expansion medium to the indicating liquid, i.e. the membrane wall, is small. So that an increase in temperature is shown quickly, the surface which transfers the pressure of the expanding wax to the indicating liquid should be as large as possible so that the acting temperature can cause the wax to exert a force on the indicating liquid as quickly as possible.

According to the present invention there is provided a volume expansion thermometer including a capillary tube of a transparent plastic material one end of which tube is open and the other end of which is attached to, and is in communication with, an otherwise closed reservoir for liquid, an expansion body disposed in the reservoir, and an indicating liquid in the reservoir and surrounding the expansion body.

In the thermometer according to the invention, all surfaces of the expansion body as opposed to only the small-surfaced membrane of the thermometer described in German Auslegeschrift No. 1,698,085, transfer the pressing effect of, for example, the wax enclosed therein to the indicating liquid surrounding the body. Since at most very little force is exerted on the walls of the reservoir of the thermometer of the invention, the thermometer body will not be subjected to, and therefore need not be stable to, high internal pressures.

In the thermometer of the invention the hollow space of the moulded hollow body made of thermoplastic material has no spacedividing elements; it has no separating wall which subdivides it into two separate chambers, i.e. the hollow space is continuous.

The capillary-like tubular portion of the moulded hollow body is open at the end thereof remote from the reservoir.

The transition of the reservoir into the capillary-like tube portion is, in a particularly advantageous form of the thermometer, edge-free, and especially is in the shape of a funnel.

There preferably is not a fixed bond between the expansion body and the inner surface of the reservoir.

The expansion body is a hollow body, the hollow space of which is enclosed unilaterally by flexible walls, the space containing an expansion medium, for example a wax. In order to achieve an adequate increase in volume of the expansion medium upon the action of heat on the thermometer, a specific quantity of expansion medium is necessary. The walls of the expansion body are preferably of a thermoplastic material, advantageously in the form of a film.

The expansion body is preferably made up of two moulded portions. The material used for the walls of the expansion body is not only intended to impart flexibility to these walls; the resistance to a force bending them is also intended to be as low as possible. The material forming the walls must have a chemically neutral behavior towards the expansion medium and the indicating liquid, and should have good workability when filling the expansion body with the expansion medium, good welding properties, as well as good travel in machines. An expansion body of low density polyethylene or of a plastic material with similar flexibility is preferred. Particularly preferred is an expansion body of low density polyethylene film. Also preferred are expansion bodies comprising two moulded portions, one moulded portion comprising a polyethylene film and the other a sufficiently thin oriented film of polyester.

The expansion medium is a chemical substance which, upon the application of heat, expands in the region of the predetermined working temperature of the thermometer by up to 16% of its original volume, e.g. in the clinical thermometer a temperature in the range of from 36° to 42°C. An especially suitable expansion medium is that known from German Auslegeschrift 1,689,085, which is based on a paraffinic hydrocarbon.

The space between the outer surface of the expansion body and the inner surface of the reservoir is filled with a quantity of indicating liquid such that the expansion body is unilaterally surrounded by the latter. The indicating liquid may be, for example, glycerin, glycol, polyglycol ether or a 3% aqueous methyl cellulose solution and it may be colored with a dyestuff.

The hollow space of the expansion body is advantageously filled with the expansion medium while it is in the liquid state at a temperature which is approximately 10°C above the maximum value of the dilatation curve of the medium used. The filled expansion body is then sealed air-free. As a result of the cooling of the expansion medium, the wall surfaces of the latter curve inwardly to a certain extent.

Upon the action of heat on the thermometer, the expansion medium expands and the walls of the expansion body arch outwards. The expansion body thus displaces indicating liquid from the reservoir into the capillary, the amount displaced being proportional to the amount of expansion of the expansion body and, therefore, to the temperature.

If the indicating liquid already extends into the capillary portion, before the action of heat on the thermometer, the column of liquid moves upwards, by a corresponding distance, in the capillary portion.

The dimensions of the hollow space of the thermometer are such that the quantity of indicating liquid is sufficient to guarantee a column of liquid in the capillary portion of a height corresponding to the temperature measured.

The moulded hollow body of the thermometer according to the invention is preferably of a transparent thermoplastic material, for example polycarbonate, polyacrylate and/or polymethacrylate, or polypropylene, more preferably transparent polyvinyl chloride, especially transparent polyvinyl chloride film. The wall thickness of the moulded hollow body should be such that adequate stability of shape of the body is guaranteed.

In a preferred embodiment, the reservoir of the moulded hollow body has a rectangular cross-section.

The expansion body preferably has such dimensions that it occupies the predominant portion of the hollow space of the reservoir.

The quantity of indicating liquid should be as small as possible, firstly because the heat will be transmitted more quickly from the outside to the expansion body and secondly because the increase in volume of the indicating liquid itself will be small as a result of an increase in temperature.

The shape and dimension of the expansion body are adapted to the shape and the dimensions of the reservoir. It must be made that much smaller so that a complete film of the indicating liquid can be formed between the walls of the expansion body and the walls of the reservoir.

The smallest quantity of indicating liquid is that quantity sufficient to register the desired minimum and maximum temperatures.

In a particularly preferred embodiment, the expansion body comprises two moulded portions securely bonded together to form a closed hollow body. In a preferred embodiment, the expansion body has a plate-like shape which is preferably rectangular, in which case it has two large surfaces lying opposite each other. Such an expansion body preferably comprises two complementary rectangular dish-like moulded portions, the lips of each portion having a narrow outwardly extending peripheral flange by which the two portions are joined together to form a hollow body. Alternatively, for example, it may comprise a dish-like moulded portion preferably having a flange as above, and a flat moulded portion, the flat portion covering the orifice of the dish as well as its flange. The two moulded portions are securely joined together by, for example, welding.

In another preferred embodiment of the thermometer, the reservoir is a hollow annular body whose hollow space preferably has a round or angular, preferably rectangular, cross-section.

In such a case the expansion body also is annular, the hollow space of which has a round, angular or, especially, semi-circular cross-section. In another embodiment, the reservoir and expansion body are annular hollow bodies whose hollow spaces have a triangular cross-section.

Preferably, the capillary has a construction near the reservoir, substantially reducing the diameter of the capillary at this position. The constriction may be located in the vicinity of the above-mentioned funnel-shaped transition between the capillary portion and the reservoir.

The thermometer body may comprise, for example, a rectangular piece of plastic film, hereinafter called the moulded base section, and a portion shaped like a dish produced by hot-shaping from a correspondingly dimensioned piece of plastic film, having a level base and two side walls with a flange projecting outwardly from the tops of the side walls, hereinafter called the dish portion, wherein both said portions are arranged with respect to one another, and are joined together, such that they enclose a hollow space. Joining of the two moulded portions may be effected in known manner by welding, sealing or adhesion. The area bounded by the outer edges of the flanges of the dish portion thus corresponds to that of the flat moulded base section of the two-part moulded body.

The "dish portion" thus includes a dished portion and a groovelike channel in communication with each other.

Alternatively, for example, the reservoir may comprise two complementary moulded parts in the form of dishes, the dishes being joined together to form a hollow body, as described above for the preferred embodiment of the expansion body. The bonding of the two complementary moulded portions of the moulded hollow body may be effected in a known manner by welding, sealing or adhesion. When manufacturing the thermometer, the expansion body is placed in the dished portion before joining the two moulded parts together.

In the preferred embodiment of the thermometer according to the invention the degree scale is advantageously applied to that portion of the flange of the dish-shaped portion of the moulded hollow body which adjoins the capillary-type tube.

The production of a thermometer according to the invention may be effected by producing dish-shaped portions described above from thermoplastic film in known manner by a heat-forming process; the same applies for the complementary moulded hollow bodies which may be used to form the expansion body. After filling the expansion body with expansion medium, introducing the expansion body into the dished-portion of a moulded portion, and after inserting the indicating liquid, the two moulded portions are securely bonded together, this being carried out by cementing, welding or sealing.

The invention is illustrated by way of example in the accompanying drawings in which:

FIG. 1 is a plan view of a thermometer of the invention,

FIG. 2 is a section through the line II—II of FIG. 1,

FIG. 3 is a section through the line III—III of FIG. 1,

Figure 4:
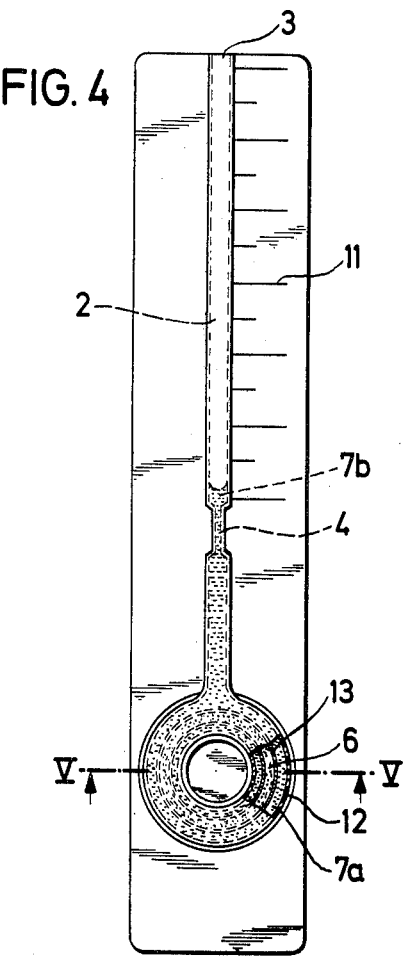
FIG. 4 is a plan view of a thermometer of the invention in which the reservoir and the expansion body are ring-shaped.

Referring to FIGS. 1 to 3, a thermometer comprises a flat base section 8 attached to a shaped section 9, having a dished portion 10, thereby to form a reservoir 1 in communication with a capillary tube 2, the upper end 3 of which is open. The capillary tube 2 has a constriction 4 therein. The reservoir 1 contains an expansion body 5 which is a hollow body filled with an expansion medium 6. The space in the reservoir 1 surrounding the expansion body 5 is filled with an indicating liquid 7a and a part of the length of the capillary tube 2 contains indicating liquid 7b. The shaped section 9 has a flange masked with a degrees scale 11.

Figure 5:
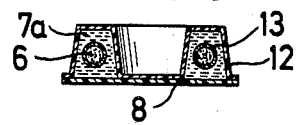
FIG. 5 is a section through the line V—V of FIG. 4.

Referring to FIGS. 4 and 5, the construction of the thermometer in this case is basically similar to the one shown in FIGS. 1 to 3 and the corresponding parts of the thermometer of FIGS. 4 and 5 are designated by the same reference numerals used in FIGS. 1 to 3. In this case the reservoir 12 is annular and has a trapezoidal cross-section and the expansion body 13 is also annular but has a circular cross-section.

It will be obvious to those skilled in the art that many modifications may be made within the scope of the present invention without departing from the spirit thereof, and the invention includes all such modifications.

What is claimed is:

1. A volume expansion thermometer comprising a capillary tube of transparent plastic material one end of which tube is open and the other end of which is attached to, and is in communication with, an otherwise closed reservoir for liquid, an expansion body in the reservoir, an indicating liquid in the reservoir and surrounding the expansion body, said capillary tube and reservoir being formed from
(a) a strip of plastic material one side of which has a channel along a part only of its length and at least a part of the remaining length of which side adjacent to said channel has a depression, and (b) a base plate adherent to the strip of plastic material thereby to form said reservoir defined by the walls of the depression and by a portion of the base plate, and said capillary being defined by the walls of the channel and a portion of the base plate, said reservoir and capillary being in communication with each other.

2. A thermometer as claimed in claim 1 wherein the reservoir is a hollow annulus and wherein the expansion body is a hollow annulus of a resilient material filled with a thermally expansible substance, said latter annulus being disposed substantially concentrically within said former annulus.

* * * * *